(43.)

FLAVIUS J. UNDERWOOD.

Improvement in Cultivators.

No. 4,665. Reissued Dec. 12, 1871.

Witnesses.
A. Ruppert
A. Edw. J. Eils

F. J. Underwood
Inventor.
D. P. Holloway & Co
Atty

AM. PHOTO-LITHOGRAPHIC CO. N.Y. (OSBORNE'S PROCESS)

UNITED STATES PATENT OFFICE.

FLAVIUS J. UNDERWOOD, OF ROCK ISLAND, ILLINOIS, ASSIGNOR TO BASIL D. BUFORD, OF SAME PLACE.

IMPROVEMENT IN CULTIVATORS.

Specification forming part of Letters Patent No. 85,412, dated December 29, 1868; reissue No. 4,665, dated December 12, 1871.

*To all whom it may concern:*

Be it known that I, FLAVIUS J. UNDERWOOD, of Rock Island, in the county of Rock Island and State of Illinois, have invented certain new and useful Improvements in Walking-Cultivators; and I do hereby declare that the following is a full, clear, and exact description thereof, reference being had to the annexed drawing making part of this specification, in which—

Figure 1:
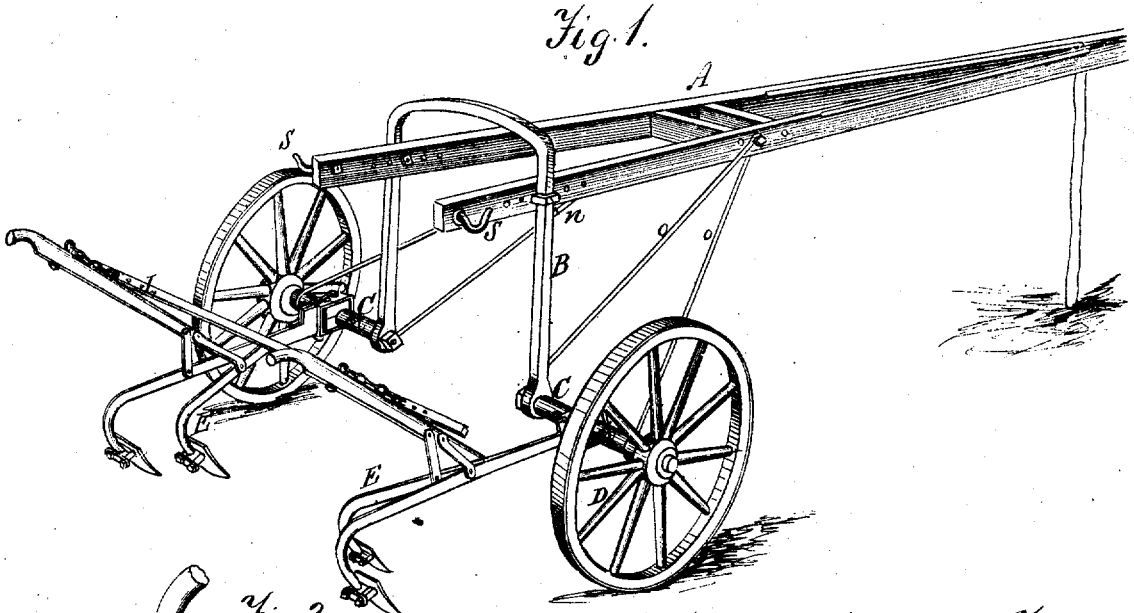
Figure 2:
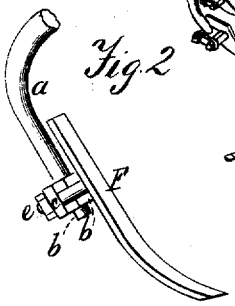
Figure 3:
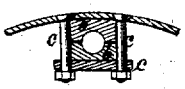
Figure 4:
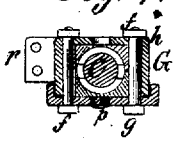
Figure 5:
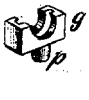
Figure 6:
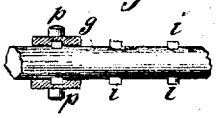
Figure 7:
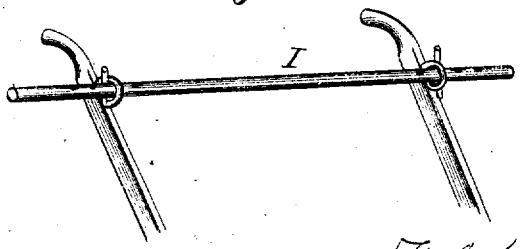

Figure 1 is a perspective view of the complete machine. Fig. 2 is an elevation of a portion of one of the plow-beams, showing the manner of attaching the shovels. Fig. 3 is a horizontal section of the same. Fig. 4 is a longitudinal vertical section through the head or joint by which the plows are attached to the axle. Fig. 5 is a transverse section of the same. Fig. 6 is a perspective view of one of the boxes belonging to the same, and Fig. 7 is a perspective view, showing another mode from that shown in Fig. 1 of coupling the handles.

In the several figures the same letters are employed in designating the same parts.

This invention relates to an improved corn-cultivator of that class known as walking-cultivators, in which the horses are attached to a frame mounted upon two wheels, to the rear of which frame the plows are secured, the operator walking behind and controlling the plows. My improvements consist in the mode of attaching the plow-beams to the axle by means of a device which, turning around the axle as a center, permits the beams to oscillate vertically, and at the same time is so constructed as to permit their horizontal oscillation; also, in the mode of attaching the shovels to the beams, by which their adjustment is provided for; also, in the manner of coupling the plows together, by which the extent of their separation is regulated and they at the same time left free to be brought nearer together; also, in certain combinations of parts to be specifically set forth and distinguished in the following specification and claims.

In the annexed drawing, A represents a strong wooden frame, the pieces being expanded at the rear end to a convenient width, and brought together at the front end to form a tongue, commonly called a split tongue. Across the wooden frame, near the rear end, I attach the bent bar B, to the ends of which the axles C C are attached. On these are the wheels D D, upon which the machine is supported. In order that the height of the frame A may be adjusted at will it is supported by means of clamps *n*, embracing the bar B, which (as well as the axles C C) is made of wrought-iron, and, passing through the wooden frame A, are drawn tightly against the bar by means of nuts. The frame A may be adjusted in height by means of these clamps; and that the axles may be arranged in any desired longitudinal relation to the frame A a series of holes is bored through the frame, to receive the shanks of the clamps, at such distance from the end of the frame A as may be desired. I prefer to attach the axles C C to the bent bar B in the manner shown, viz., by passing them through eyes in the ends of the bar B and securing them by nuts screwed down upon the threaded ends of the axle. In order to sustain the axles in position without too great a strain upon the bar B and its clamp *n* I extend brace-rods *o o* from each end of each axle, inside the wheels, to the frame A, by which the axles are maintained in their proper relation to the frame. The plow-beams are attached directly to the axles C C. They also are made of wrought-iron bent to the form shown in the drawing. It is necessary that they should be so attached that they may have both a vertical and a horizontal oscillation. This I accomplish in the following manner: The coupling-joints G are attached to the front end of the plow-beams and encircle the axles, upon which they turn as a center, the axles being made round for the purpose of giving the coupling-joints the requisite vertical oscillation. The construction of the coupling-joints is shown in detail in Figs. 4, 5, and 6. The axles are constructed with a series of studs, *i*, disposed at intervals along their length, and are embraced by boxes *g g*, having each a groove in their inner face to receive the studs *i*, so that the boxes while held in place may yet turn freely around the shaft or axle. On their opposite faces they have trunnions *p*, on which the plow-beams may swing horizontally, the beams being connected with the boxes by means of the plates *h h*, which, embracing the boxes and constructed with round holes to receive the trunnions *p*, are fastened to the front ends of the plow-beams, and are clamped together by the bolts and nuts *h*. The studs *i* are arranged in pairs on opposite sides of the axles. By this means the plow-beams swing vertically, oscillating upon the axles as their centers, and horizontally upon the trunnions *p p*. The iron beams E are bent to the proper curvature to receive the shovels F, which are adjustably attached thereto in the following manner: The stud-bolts *e e*, projecting behind the shovels, embrace on two sides the boxes *b b*, which, encircling the shank of the plow-beams, are secured against the back of the shovels and between the stud-bolts by the plate *c*, compressed against them by nuts on the stud-bolts. The shovels may be easily adjusted vertically upon the shank of the plow-beams, or, the shank being round, they may be inclined so as to throw the earth to either side, if so desired. The plow-handles are attached to the beams, and are connected in such manner that when adjusted to a particular width they may be freely approached, but cannot be further separated without readjustment. One means of accomplishing this is shown in Fig. 1, in which a light wooden bar, I, is shown as connected with the handles by chains of adjustable length, which prevent the separation of the plows beyond the fixed gauge, but permit the operator to bring them nearer together. Another mode of connecting the handle is shown in Fig. 7, in which the bar, passed through eyes fastened to the handle, is adjustably secured by passing pins through holes in the bar. The hooks S, shown on the end of the frame A, are to suspend the plows when not at work.

I am aware that a bent frame and axles of iron have heretofore been attached to a wooden frame, and I do not, therefore, claim this construction, broadly; but my machine is distinguished from all heretofore known in this respect, that the frame A is adjustably connected with the bent axle, so that it may be raised or lowered at will; and also in this, that it may be adjustably connected at such point along its length as may be desired. I am also aware that in this class of cultivators the plow-beams have been so connected with the axle that they might be swung horizontally and vertically, and I do not, therefore, claim this combination and arrangement, broadly; but my improvement is distinguished from all former machines in this, that the coupling device is made to inclose a round axle and to turn vertically upon this as a center; and also in this, that the plow-beams may be adjusted at different distances apart and still be connected in manner last aforesaid. I am aware, also, that bars have been used to regulate the space between the plows, and I do not, therefore, claim this feature, broadly, but only as limited by the arrangement for controlling the maximum distance by a fixed gauge, leaving the plows free to be brought closer together by the operator.

What I claim as my invention, and desire to secure by Letters Patent, is—

1. In combination with the plow-beams E and round axles C, a coupling-joint, G, which, encircling the axle, turns around it as a center.

2. In combination with the elements last aforesaid, a joint upon which the plow-beams may swing horizontally as well as have a vertical oscillation.

3. The studs *i* upon the axle, in combination with the plow-beams and grooved boxes *g* forming part of the joint-coupling G.

4. A series of studs, *i*, arranged along the axle C, in combination with the plow-beams and adjustable grooved couplings.

5. The coupling G, including in its construction the parts *g*, *p*, *h*, and *f*.

6. In combination with the bent beams E and shanks F, the bolts *e*, boxes *b*, and plates *c* for adjustably connecting the shanks and beams.

7. In combination with the shanks F and a device substantially such as set forth for connecting them, the bent beams E, when made round at their lower ends so that the shovels may be adjusted to throw the earth to either side and be raised or lowered to regulate the depth of plowing.

8. In combination with the plow-beams E, a frame, B C, to which the said beams and the wheels are attached, and a frame, A, adjustably connected with one another so that the frame A can be raised or lowered without affecting the position of the plow-beams and plows, substantially as set forth.

9. The parts last aforesaid when adjustably connected horizontally in relation to one another, substantially in the manner set forth.

10. The axles C C and bar B, when respectively so constructed that the axles may be attached or detached, substantially as set forth.

11. The bar I and plow-handles in combination, when so arranged as to limit the distance to which the handles may be separated, but leaving them free to be approached at the will of the operator.

FLAVIUS J. UNDERWOOD.

Witnesses:

HENRY CURTIS, JR.,

AUGUST M. BUNDING.

(43)